(12) United States Patent
Heo et al.

(10) Patent No.: US 10,945,026 B2
(45) Date of Patent: Mar. 9, 2021

(54) DISPLAY DEVICE

(71) Applicant: LG ELECTRONICS INC., Seoul (KR)

(72) Inventors: Seunghyun Heo, Seoul (KR); Jaekyung Lee, Seoul (KR); Jeean Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/306,727

(22) PCT Filed: Jun. 24, 2016

(86) PCT No.: PCT/KR2016/006795
§ 371 (c)(1),
(2) Date: Dec. 3, 2018

(87) PCT Pub. No.: WO2017/222097
PCT Pub. Date: Dec. 28, 2017

(65) Prior Publication Data
US 2019/0132635 A1  May 2, 2019

(51) Int. Cl.
*H04N 21/472* (2011.01)
*H04N 21/439* (2011.01)
(Continued)

(52) U.S. Cl.
CPC ......... *H04N 21/433* (2013.01); *H04N 21/439* (2013.01); *H04N 21/4394* (2013.01);
(Continued)

(58) Field of Classification Search
CPC ............. H04N 21/433; H04N 21/4394; H04N 21/4622; H04N 21/4431; H04N 21/4825;
(Continued)

(56) References Cited

U.S. PATENT DOCUMENTS

| 4,390,904 A * | 6/1983 | Johnston .............. G11B 27/024 358/908 |
| 2006/0059535 A1* | 3/2006 | D'Avello ............. H04H 20/106 725/139 |

(Continued)

FOREIGN PATENT DOCUMENTS

| JP | 2002-244866 A | 8/2002 |
| JP | 2007-150764 A | 6/2007 |

(Continued)

*Primary Examiner* — Cynthia M Fogg
(74) *Attorney, Agent, or Firm* — Birch, Stewart, Kolasch & Birch, LLP

(57) ABSTRACT

A display device according to an embodiment of the present invention comprises: a display unit; a storage unit for storing a reproduction list including a first content provided by a first content provider and a second content provided by a second content provider; and a controller for displaying the reproduction list through the display unit, reproducing the first content included in the displayed reproduction list through an application associated with the first content provider, sensing whether the reproduction of the first content has been completed, and reproducing the second content through an application associated with the second content provider on the basis of a sensing result.

9 Claims, 16 Drawing Sheets

(51) Int. Cl.
  *H04N 21/44* (2011.01)
  *H04N 21/8545* (2011.01)
  *H04N 21/482* (2011.01)
  *H04N 21/462* (2011.01)
  *H04N 21/433* (2011.01)
  *H04N 21/443* (2011.01)

(52) U.S. Cl.
  CPC ......... *H04N 21/44* (2013.01); *H04N 21/4431* (2013.01); *H04N 21/4622* (2013.01); *H04N 21/47217* (2013.01); *H04N 21/4825* (2013.01); *H04N 21/8545* (2013.01)

(58) Field of Classification Search
  CPC .. H04N 21/8545; H04N 21/44; H04N 21/439; H04N 21/47217; H04N 21/26258; H04N 21/2665; H04N 21/4316; H04N 21/8456; H04N 21/44008; H04N 21/2187; H04N 21/4722; H04N 21/8133; H04N 21/23418; H04N 21/8352; H04N 21/4755; G06F 16/639; G06F 16/4387
  USPC ........................................................ 725/142
  See application file for complete search history.

(56) References Cited

U.S. PATENT DOCUMENTS

| | | | | |
|---|---|---|---|---|
| 2008/0271078 | A1* | 10/2008 | Gossweiler | H04N 21/4532 725/40 |
| 2009/0259926 | A1* | 10/2009 | Deliyannis | G06T 7/20 715/205 |
| 2010/0010648 | A1* | 1/2010 | Bull | G06F 16/44 700/94 |
| 2011/0225496 | A1* | 9/2011 | Jeffe | G06F 16/639 715/716 |
| 2011/0247035 | A1* | 10/2011 | Adimatyam | H04N 21/4828 725/39 |
| 2011/0320020 | A1* | 12/2011 | Price | G06F 16/4387 700/94 |
| 2012/0060100 | A1* | 3/2012 | Sherwood | H04N 21/4122 715/748 |
| 2013/0139271 | A1* | 5/2013 | Arrelid | G06F 21/62 726/27 |
| 2014/0082647 | A1* | 3/2014 | Verrilli | H04N 21/4828 725/14 |
| 2016/0227281 | A1* | 8/2016 | Abuelsaad | H04N 21/4583 |
| 2016/0241922 | A1* | 8/2016 | Carpenter | H04N 21/6543 |
| 2016/0357737 | A1* | 12/2016 | Oklota | G06F 16/438 |

FOREIGN PATENT DOCUMENTS

| | | |
|---|---|---|
| JP | 2010-239209 A | 10/2010 |
| KR | 10-2013-0075783 A | 7/2013 |
| KR | 10-2016-0053861 A | 5/2016 |

\* cited by examiner

DISPLAY DEVICE

CROSS REFERENCE TO RELATED APPLICATIONS

This application is the National Phase of PCT International Application No. PCT/KR2016/006795, filed on Jun. 24, 2016, which is hereby expressly incorporated by reference into the present application.

TECHNICAL FIELD

The present invention relates to a display device, and more particularly to a display device capable of integrating, managing, and reproducing multimedia content provided by a plurality of content providers.

BACKGROUND ART

Display devices, such as smart TVs or IPTVs, which have been extensively spread, may provide various pieces of multimedia content for users, which are different from existing displays providing only real-time broadcasts The multimedia content may be received from various content providers and the content providers provide dedicated applications (for example, reproduction applications) to provide the multimedia content. As the dedicated applications are installed in the display devices, the user may use multimedia content provided by a relevant content provider.

When multiple pieces of content to be used by the user is provided by various content providers, the user has to manually execute and terminate a plurality of dedicated applications to use the multiple pieces of content. Accordingly, continuous reproduction is difficult between the multiple pieces of content, so the user may feel bothered in using the multiple pieces of content.

DISCLOSURE

Technical Problem

The objective of the present invention is to provide a method for integrally managing and reproducing multimedia content provided by various content providers when multimedia content is used through a display device.

Technical Solution

According to an embodiment of a display device includes a display unit, a memory to store a playback list including first content provided by a first content provider and a second content provided by second content provider, and a controller to display the playback list on the display unit, to reproduce the first content included in the displayed playback list through an application associated with the first content provider, to determine whether the first content is completely reproduced, and to reproduce the second content through an application associated with the second content provider based on a sensing result.

The controller may display, when a multimedia reproducing application installed in the display device is executed, the playback list of the executed multimedia reproducing application on the display unit.

According to an embodiment, the controller may acquire information on content currently provided through the display device, create at least one search command based on the acquired information, search for at least one piece of content associated with the currently provided content using the created search command, and display the at least one associated content, which is found, on the display unit.

The controller may include display, on the display unit, a search result window including the at least one associated content which is found. The search result window may include at least one search category corresponding to each of the at least one search command. Each of the at least one associate content may be included in one of the at least one search category.

The controller may receive a request for adding one associated content of the at least one associated content, which is displayed on the display unit, to the playback list, and may add the one associated content to the playback list in response to the received request.

The display device may further include a reproduction completion sensor to sense whether content is completely reproduced, and the controller may reproduce the second content through the application associated with the second content provider, when it is sensed, by the reproduction completion sensor, that the first content is completely reproduced.

The reproduction completion sensor may sense whether an audio signal associated with the first content is transmitted to an audio output unit, and sense that the first content is completely reproduced, when the audio signal fails to be transmitted to the audio output unit for a reference time, based on the sensing result.

The controller may deactivate a sensing operation of the reproduction completion sensor, when an audio portion of the first content is not output in response to a mute command received during reproduction of the first content.

The reproduction completion sensor may sense whether a video signal associated with the first content is transmitted to the display unit, and sense that the first content is completely reproduced, when the video signal fails to be transmitted to the display unit for a reference time, based on the sensing result.

The display unit may display a reproduction screen of the application associated with the first content provider, when the first content is reproduced. The reproduction completion sensor may recognize reproduction state information included in the reproduction screen through image recognition, and sense whether the first content is completely reproduced by using the recognized reproduction state information.

Advantageous Effects

As described above, according to various embodiments of the present invention, the display device may manage and reproduce content, which is provided by various content providers, in one playback list, thereby improving the convenience of the user.

In addition, when the user tries to add content associated with multimedia content, which is currently being reproduced, to the playback list, the user may conveniently search for the associated content and easily add the found content to the playback list, thereby increasing the use convenience.

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, embodiments of the present invention will be described in detail with reference to the accompanying drawings.

Figure 1:
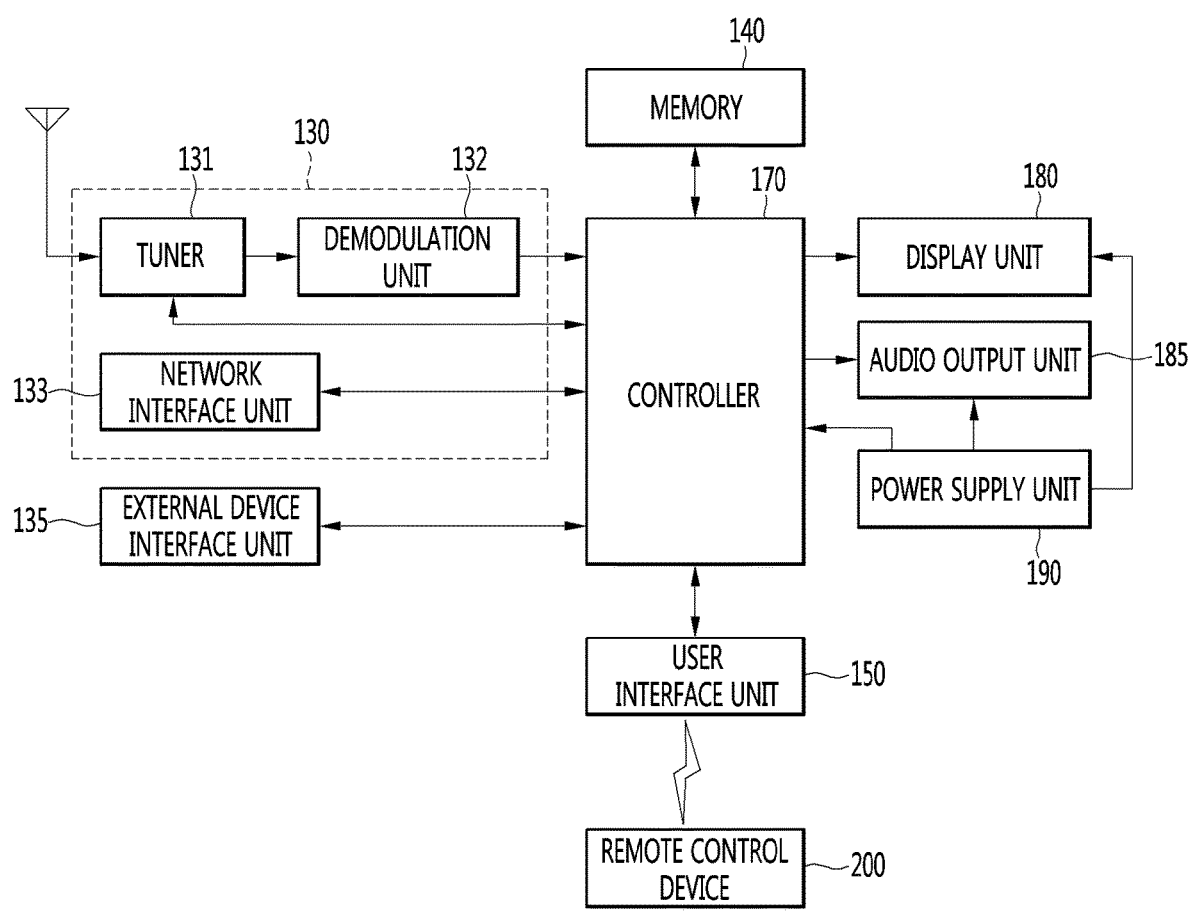
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, the display device 100 may be implemented with a TV, a monitor, a projector, or a device including the same.

A display device 100 can include a broadcast reception unit 130, an external device interface unit 135, a memory 140, a user input interface unit 150, a controller 170, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The external device interface unit 135 can receive an application or an application list in an adjacent external device and deliver it to the controller 170 or the memory 140.

The external device interface 135 can provide a connection path between the display device 100 and an external device. The external device interface 135 can receive at least one of image and audio output from an external device that is wirelessly or wiredly connected to the display device 100 and deliver it to the controller 170. An external device connectable to the external device interface unit 135 can be one of a set-top box, a Blu-ray player, a DVD player, a game console, a sound bar, a smartphone, a PC, a USB Memory, and a home theater system but this is just exemplary.

The memory 140 can store signal-processed image, voice, or data signals stored by a program in order for each signal processing and control in the controller 170.

Additionally, the memory 140 can perform a function for temporarily store image, voice, or data signals output from the external device interface unit 135 or the network interface unit 133 and can store information on a predetermined image through a channel memory function.

The memory 140 can store an application or an application list inputted from the external device interface unit 135 or the network interface unit 133.

The display device 100 can play content files (for example, video files, still image files, music files, document files, application files, and so on) stored in the memory 140 and provide them to a user.

The user input interface unit 150 can deliver signals inputted from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (UWB), ZigBee, Radio Frequency (RF), and IR.

Additionally, the user input interface unit 150 can deliver, to the controller 170, control signals inputted from local keys (not shown) such as a power key, a channel key, a volume key, and a setting key.

Image signals that are image-processed in the controller 170 can be inputted to the display unit 180 and displayed as an image corresponding to corresponding image signals. Additionally, image signals that are image-processed in the controller 170 can be inputted to an external output device through the external device interface unit 135.

Voice signals processed in the controller 170 can be output to the audio output unit 185. Additionally, voice signals processed in the controller 170 can be inputted to an external output device through the external device interface unit 135.

Besides that, the controller 170 can control overall operations in the display device 100.

Additionally, the controller 170 can control the display device 100 by a user command or internal program inputted through the user input interface unit 150 and download a desired application or application list into the display device 100 in access to network.

The controller 170 can output channel information selected by a user together with processed image or voice signals through the display unit 180 or the audio output unit 185.

Additionally, according to an external device image playback command received through the user input interface unit 150, the controller 170 can output image signals or voice signals of an external device such as a camera or a camcorder, which are inputted through the external device interface unit 135, through the display unit 180 or the audio output unit 185.

Moreover, the controller 170 can control the display unit 180 to display images and control broadcast images inputted through the tuner 131, external input images inputted through the external device interface unit 135, images inputted through the network interface unit, or images stored in the memory 140 to be displayed on the display unit 180. In this case, an image displayed on the display unit 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

The display unit 180 can convert image signals, data signals, or OSD signals, which are processed in the controller 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
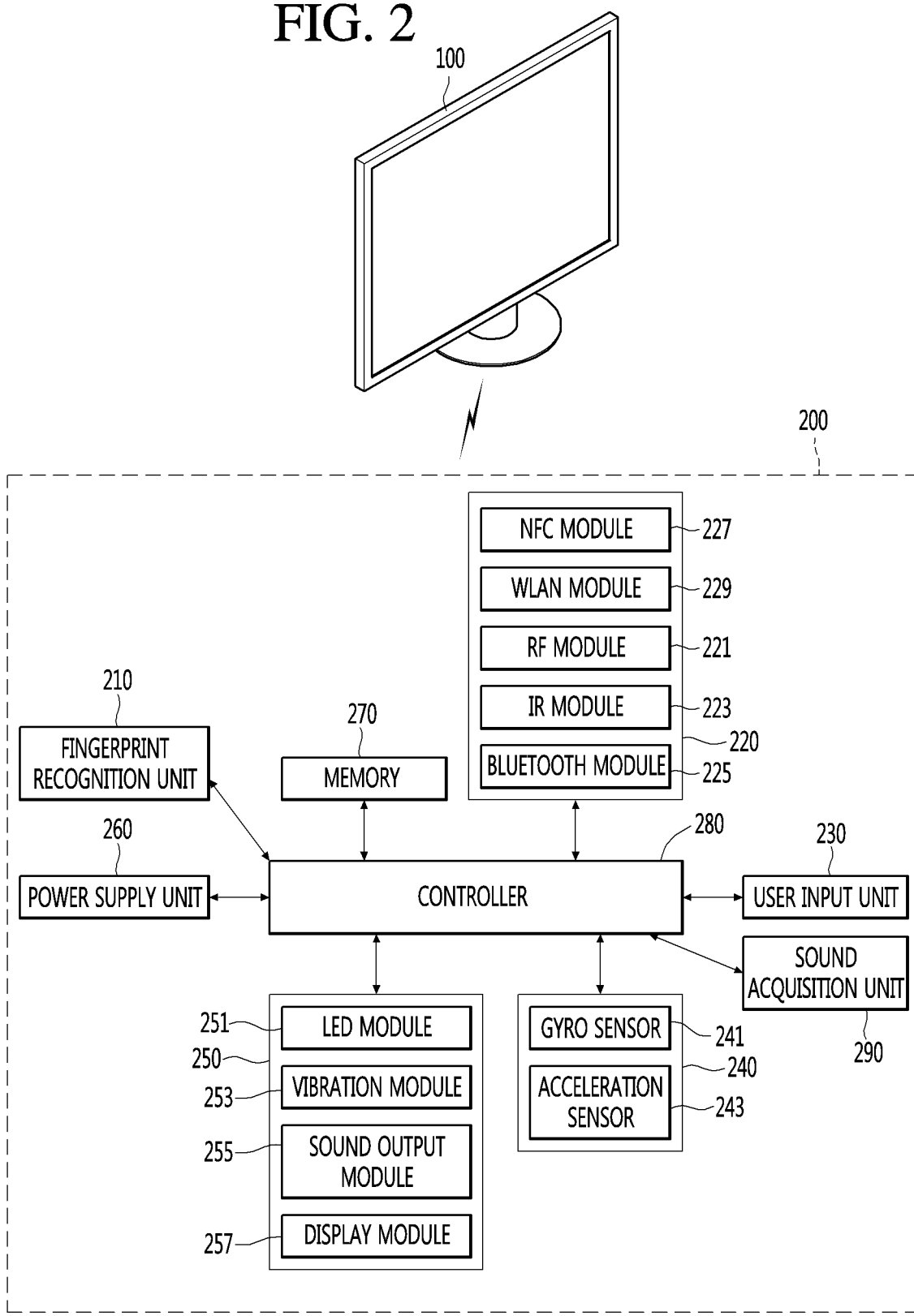
FIG. 2 is a block diagram illustrating a remote control device according to an embodiment of the present invention.
Figure 3:
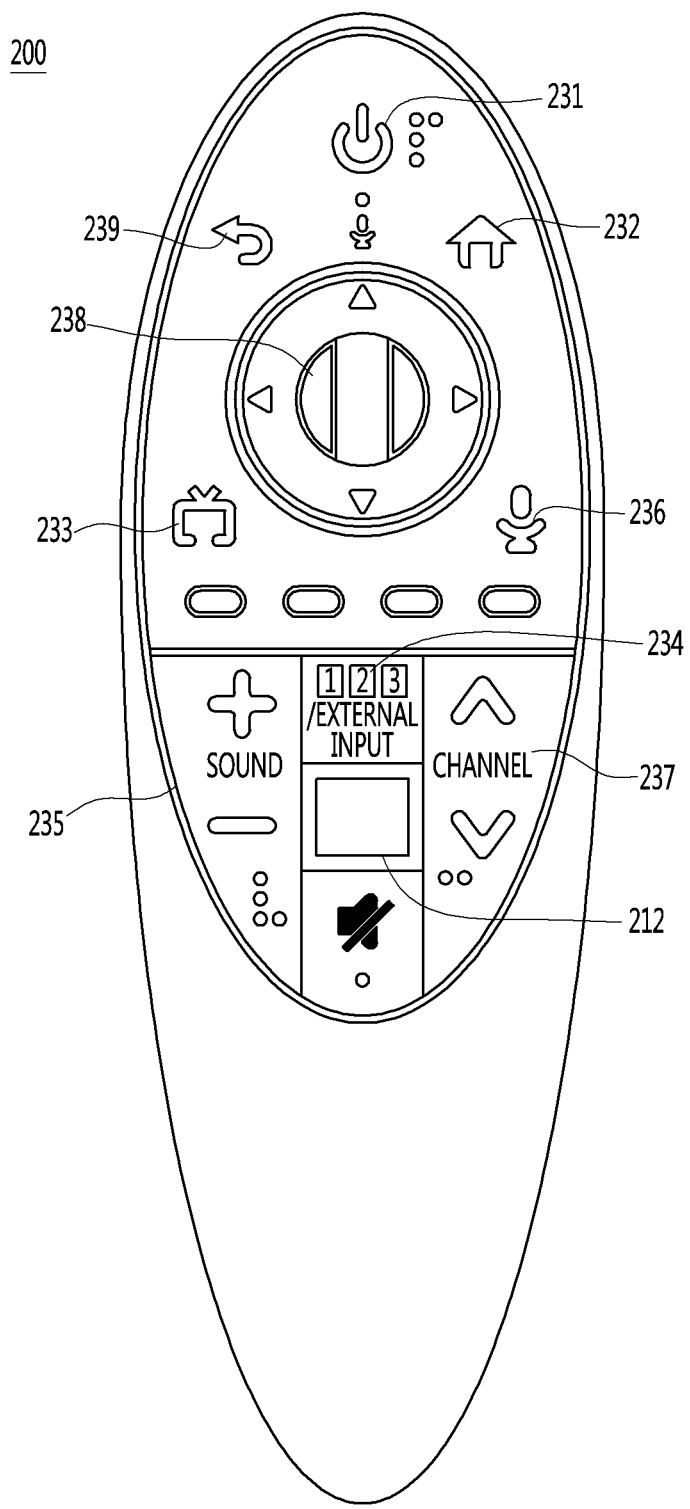
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 220 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 230 or corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage unit 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input unit 230 or a signal corresponding to a movement of the remote control device 200 sensed by the sensor unit 240 to the display device 100 through the wireless communication unit 220.

Additionally, the voice acquisition unit 290 of the remote control device 200 can obtain voice.

The voice acquisition unit 290 can include at least one microphone 291 and obtain voice through the microphone 291.

Figure 4:
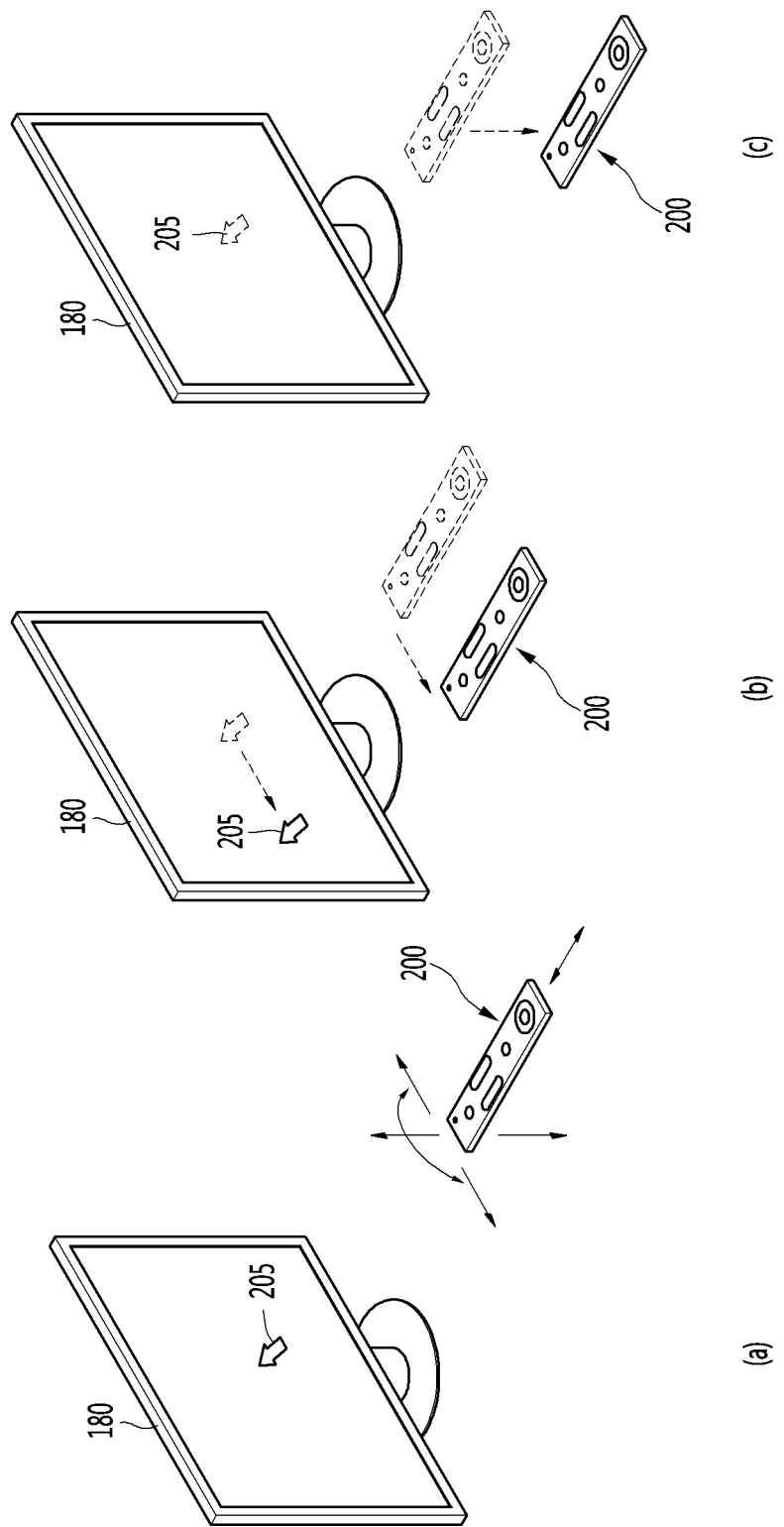
FIG. 4 is a view of utilizing a remote control device according to an embodiment of the present invention.

Then, FIG. 4 is described.

FIG. 4 is a view of utilizing a remote control device according to an embodiment of the present invention.

FIG. 4 illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4 illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4 illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
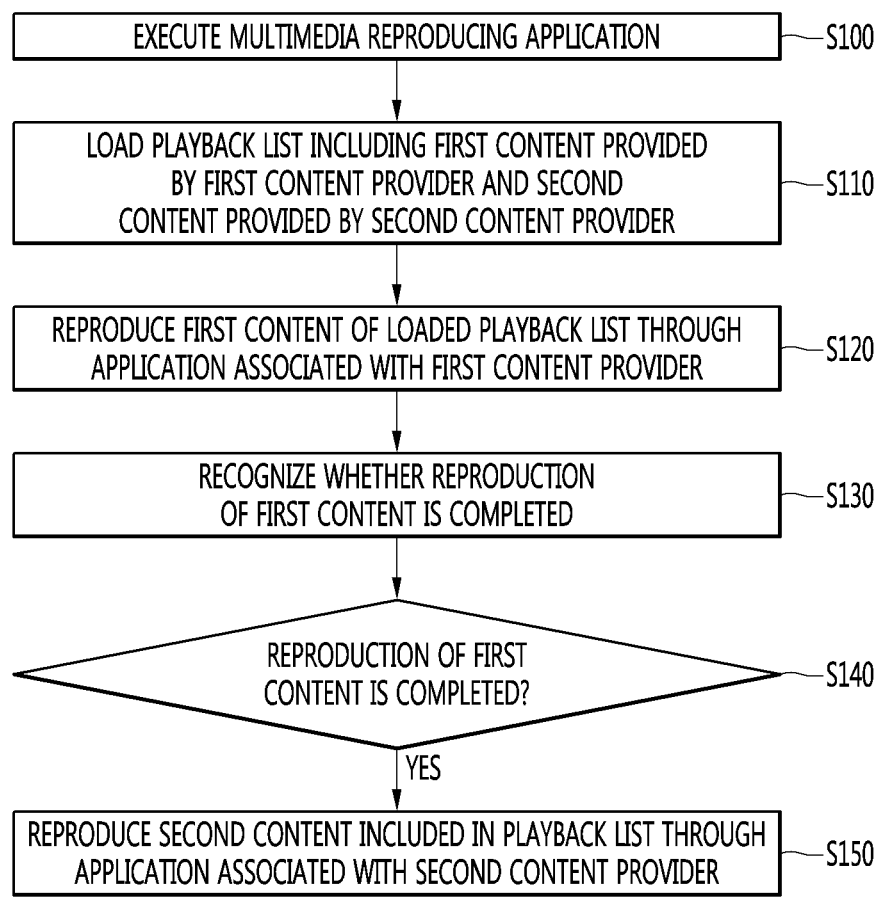
FIG. 5 is a flowchart illustrating a method for operating the display device according to an embodiment of the present invention.

FIG. 5 is a flowchart illustrating a method for operating the display device according to an embodiment of the present invention.

Referring to FIG. 5, the display device 100 may execute a multimedia reproducing application (S100).

In detail, the controller 170 of the display device 100 may execute a multimedia reproducing application installed in the display device 100 and the memory 140, in response to the request for executing the multimedia reproducing application. The multimedia reproducing application may be a kind of a music player, but the present invention is not limited thereto. The multimedia reproducing application may refer to an application capable of reproducing various types of multimedia content.

The display device 100 having the multimedia reproducing application executed therein may load a playback list including first content provided by a first content provider and second content provided by a second content provider (S110).

In other words, according to an embodiment of the present invention, the playback list of the multimedia reproducing application may include various pieces of content provided by a plurality of content providers. The plurality of content providers may include various content providing service platforms such as a music source streaming service platform, a multimedia content streaming service platform, and a music download service platform. In particular, the plurality of content providers may include the display device 100. In this case, the content provided by the display device 100 may mean multimedia content stored in the memory 140. Typically, the plurality of content providers may provide the respective content using a dedicated application.

According to an embodiment of the present invention, the display device 100 may add content provided by various content providers to one playback list. In this connection, details thereof will be described in more with reference to FIGS. 6 to 11B.

Figure 6:
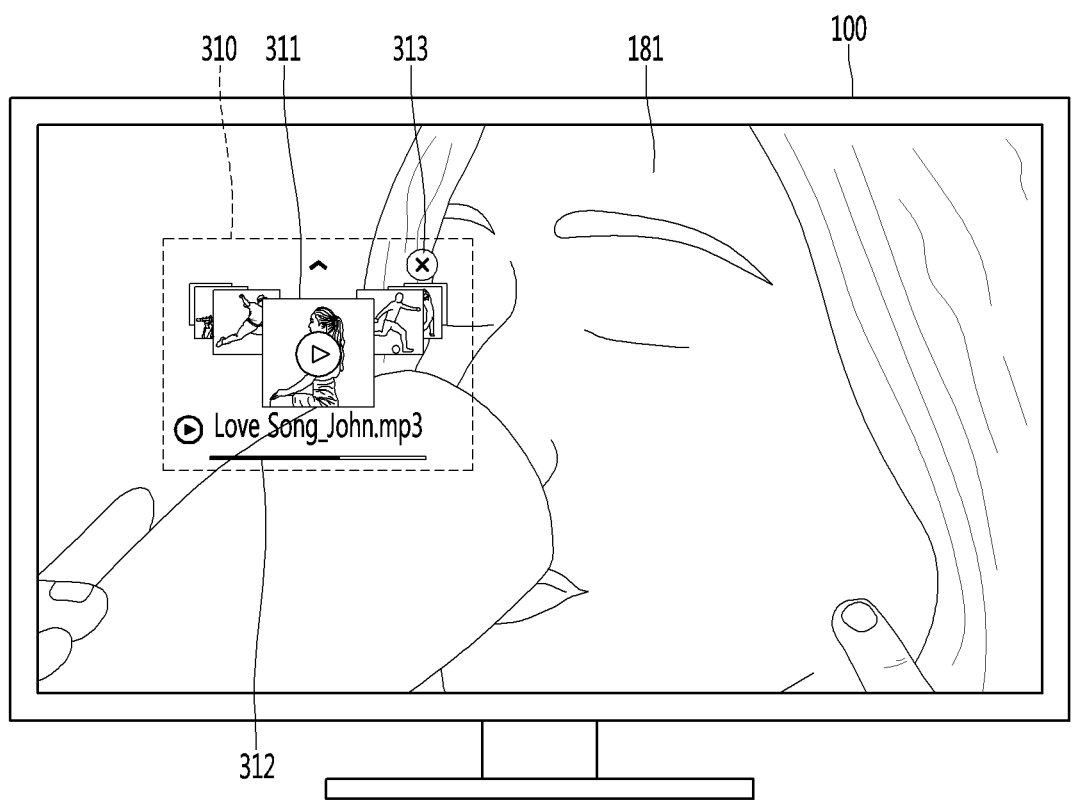
FIG. 6 is a view illustrating a screen displayed when the multimedia reproducing application installed in the display device is executed, according to an embodiment.

FIG. 6 is a view illustrating a screen displayed when the multimedia reproducing application installed in the display device is executed, according to an embodiment.

Referring to FIG. 6, the controller 170 of the display device 100 may execute the multimedia reproducing application in response to the request for executing the multimedia reproducing application. The execution request may refer to an input for selecting a multimedia reproducing application icon (not shown) displayed through the display 180, but the present invention is not limited thereto and may be implemented in various forms.

The controller 170 may load the playback list for the executed multimedia reproducing application from the memory 140. According to an embodiment, when the playback list is stored in a separate server (or database server) instead of the memory 140, the controller 170 may receive the playback list from the server and load the received playback list. The playback list may include a name (title), a thumbnail image, a uniform resource locator (URL) of each of multiple pieces of content. The controller 170 may display the loaded playback list on an execution screen 310 of the multimedia reproducing application.

The controller 170 may display the execution screen 310 of the multimedia reproducing application on the display 180. Although FIG. 6 illustrates that the execution screen 310 is displayed on content (for example, broadcast content 181) currently displayed on the display 180, the controller 170 may display only the execution screen 310 on the display 180 and may not display the content 181 or may display the content 181 on a portion of the display 180, when the multimedia reproducing application is executed. In other words, when the multimedia reproducing application is executed, the execution screen 310 and the content 181 currently provided may be displayed in various forms.

The execution screen 310 of the multimedia reproducing application may display the loaded playback list. In other words, the execution screen 310 may include a thumbnail image 311 of each of multiple pieces of content included in the playback list, the file name of the currently reproduced content, a progress bar 312 representing the reproduction state of the content, and a termination icon 313 for terminating the multimedia reproducing application.

As described above, the playback list may include various pieces of content provided by a plurality of content providers. According to an embodiment of the present invention, the display device 100 may continuously reproduce multiple pieces of content provided by mutually different service providers and may integrally manage the multiple pieces of content, by using the playback list. Hereinafter, embodiments that various pieces of content is added to the playback list will be described with reference to FIGS. 7 to 10.

Figure 7:
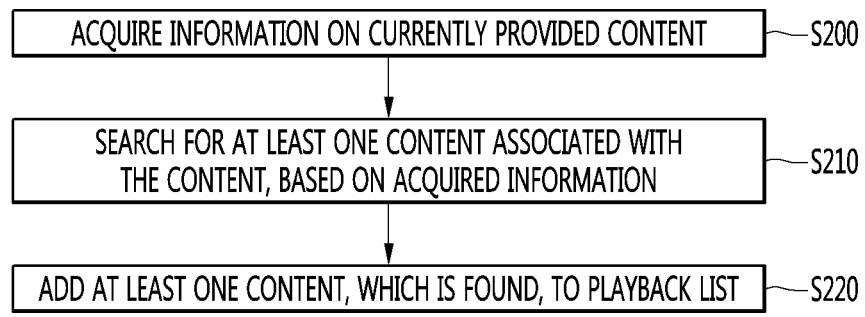
FIG. 7 is a flowchart illustrating an operation that the display device adds at least one content associated with the currently provided content to the playback list according to an embodiment of the present invention.

FIG. 7 is a flowchart illustrating an operation that the display device adds at least one content associated with the currently provided content to the playback list according to an embodiment of the present invention.

Referring to FIG. 7, the display device 100 may acquire information on the currently provided content (S200). In this case, the currently provided content may include content, which is being reproduced through the multimedia reproducing application, broadcast content received and output through a tuner 131, and various pieces of content received and output through a network interface 133 or an external device interface 135, but the present invention is not limited thereto, When the content is reproduced (or output), the controller 170 may store information on the reproduced content in the memory 140. When the reproduced content is changed, the information on the content stored in the memory 140 may be updated. The information on the content may mean various types of information, such as a title, an artist, or a genre on the content.

The controller 170 may receive a search request through the user interface unit 150 and may acquire information on the content stored in the memory 140 in response to the received search request.

The display device 100 may search for at least one content related to the currently provided content based on the acquired information (S210). According to an embodiment, the display device 100 may include the search module, and the controller 170 may perform the search operation under the operation of the search module.

In detail, the search module may create at least one search command based on information on the content acquired according to step S200. For example, the search command may include a search word and a search route (a search position or a content provider to be searched), but the present invention is not limited thereto.

The controller 170 (or the search module) may perform a search operation using the created search command. Specifically, the controller 170 may perform a search operation by using the search word, which included in the search command, in the content provider contained in the search command and may receive, as a search result, information on content associated with the search word. Since the search word is created based on information on the currently provided content, the at least one content, which is searched, may be content associated with the currently provided content.

The display device 100 may add the at least one content, which is found, to the playback list (S220). In detail, the controller 170 may receive the request for adding, to the playback list, a portion or an entire portion of at least one piece of content found according to step S210 and may add a portion or an entire portion of the found content to the playback list in response to the received adding request. In this case, various contents found from a plurality of content providers may be added to the playback list.

The steps illustrated in FIG. 7 will be described in more detail with respect to FIG. 8A to FIG. 10.

Figure 8A:
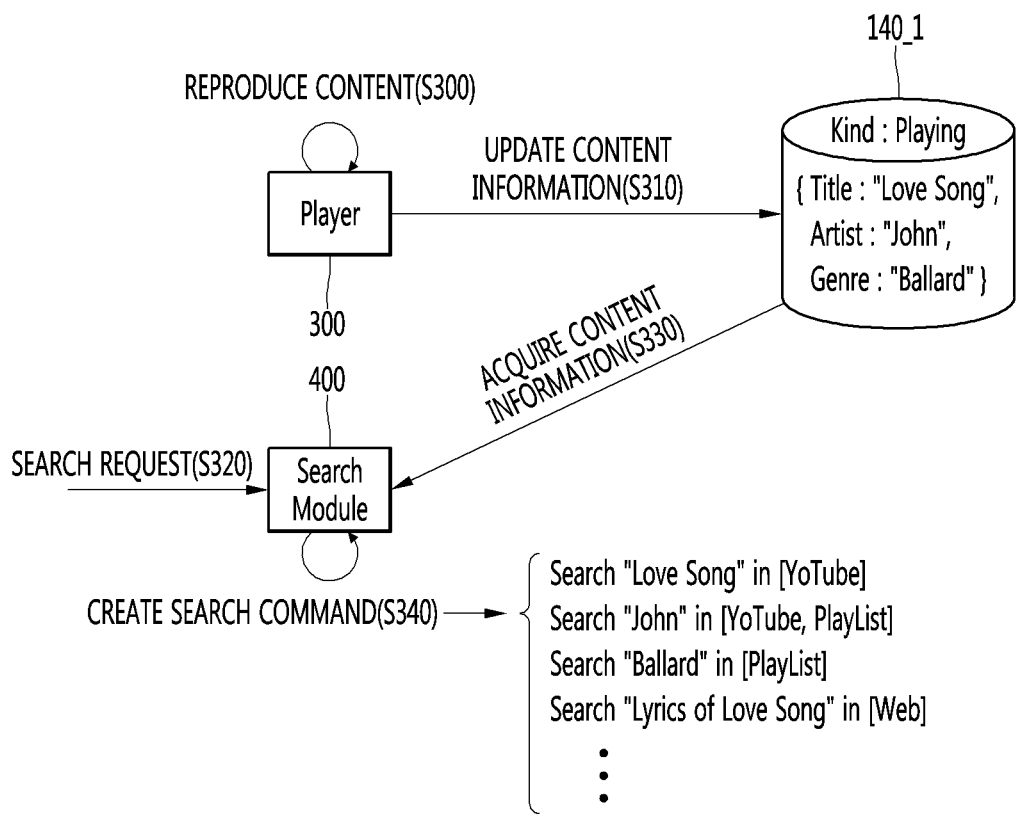
FIGS. 8A and 8B illustrate an embodiment of an operation that at least one content associated with content provided through the multimedia reproducing application is found and the at least one content, which is found, is displayed.
Figure 8B:
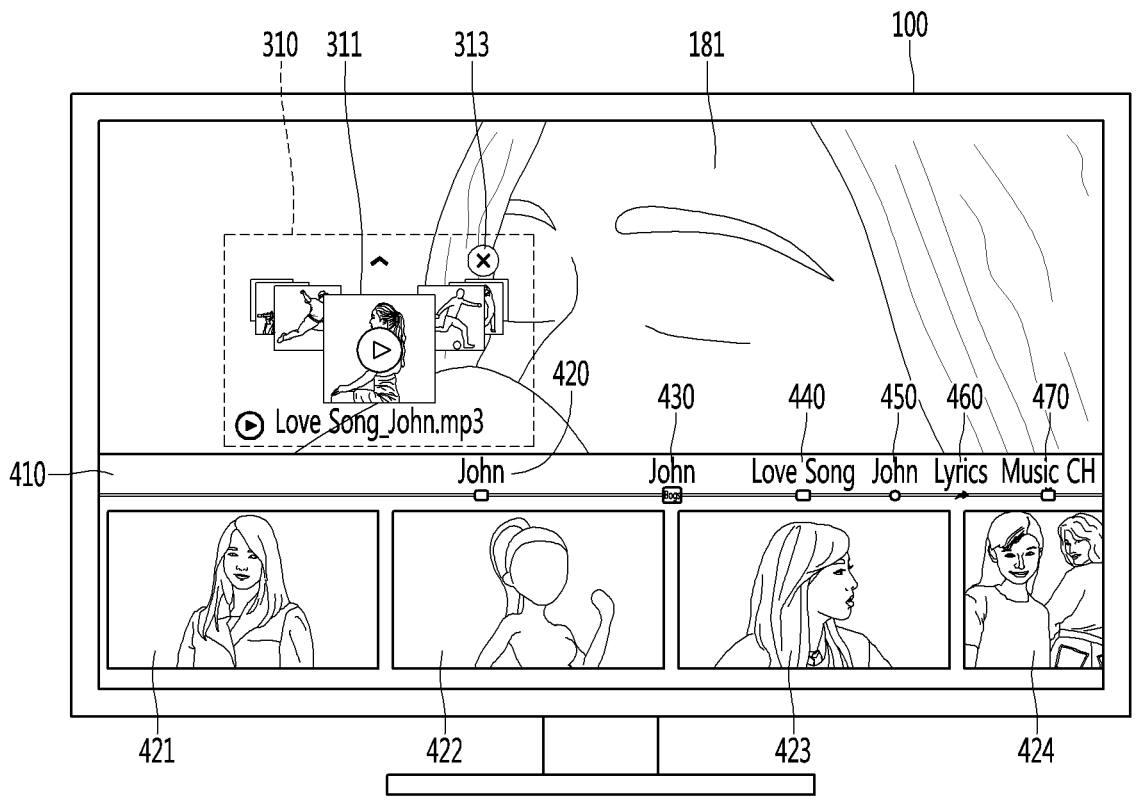

FIGS. 8A and 8B illustrate an embodiment that at least one content associated with content provided through the multimedia reproducing application is searched and the operation of displaying the at least one content which is found.

In the present disclosure, a player 300 refers to a multimedia reproducing application. In addition, each of the player 300 and a search module 400 may be controlled by the controller 170. In other words, that the player 300 or the search module 400 performs a certain operation may refer to that the controller 170 controls the player 300 or the search module 400 to perform the certain operation, if necessary, that the controller 170 performs the certain operation.

In addition, although it is illustrated that the search module 400 is included in the display device 100, the search module 400 may be included in an additional server associated with the display device 100 according to the embodiment.

Referring to FIG. 8A, the player 300 may reproduce any one of at least one content included in the playback list (S300). In this case, it is assumed that the content reproduced by the player 300 is music content.

The player 300 may update information on the currently provided content into a first database 140_1 (S310). The first database 140_1 may store information on the currently reproduced content. The first database 140_1 may be included in the memory 140, but the present invention is not limited thereto. The first database 140_1 may be configured separately from the memory 140.

The information on the currently reproduced content may include the title of content, an artist, and a genre, but the present invention is not limited thereto. The information on the current reproduced content may include various pieces of information associated with the currently reproduced content. For example, when the title of the currently playing content is 'Love Song', the artist is 'John' and the genre is 'ballad', the player 300 may update the information in the first database 140_1.

The controller 170 may receive the search request through the user input interface unit 150 (S320). For example, the search request may be received as a search button is input in the remote control device 200, or may be received by selecting a search icon displayed through the display unit 180, but the present invention is not limited thereto. The controller 170 may control the operation of the search module 400 in response to the received search request.

The search module 400 may acquire content information from the first database 140_1 (S330), and may create at least one search command using the acquired content information (S340).

FIG. 8A illustrates examples of search commands generated by the search module 400. The search command may include a search keyword, and a content provider to be searched, but the form of the search command may be variously implemented. The search module 400 creates various search keywords ("Love Song", "John", "Ballard", "The lyrics of Love Song" by using the content information acquired from the first database 140_1 and may perform the search operation based on the search keyword with respect to various content providers (for example, "YouTube", "Bogs", "playback list", and "Web")

Referring to FIG. 8B, the controller 170 may display a search result window 410 on the display unit 180. Although FIG. 8B illustrates that the search result window 410 is displayed on a portion of the display 180, the search result window 410 may be implemented in various forms.

The search result window 410 may include search categories 420, 430, 440, 450, 460, and 470. The search categories 420, 430, 440, 450, 460, and 470 may correspond to each of the search commands generated by the search module 400. As illustrated in FIG. 8B, the search categories 420, 430, 440, 450, 460, and 470 may visually represent the search keyword and/or information on the searching content provider.

When one (for example, the first search category 420) of the search categories 420, 430, 440, 450, 460, and 470 is selected, the list of the contents 421, 422, 423, and 424 may be displayed through the search command corresponding to the first search category 420. Since the search command is created based on information on the currently reproduced content 311, the content 421, 422, 423, and 424 found through the created search command may be associated with the currently reproduced content 311.

In other words, according to the embodiment illustrated in FIGS. 8A and 8B, the user may conveniently search for various pieces of content associated with the content currently reproduced through the multimedia reproducing application.

Figure 9A:
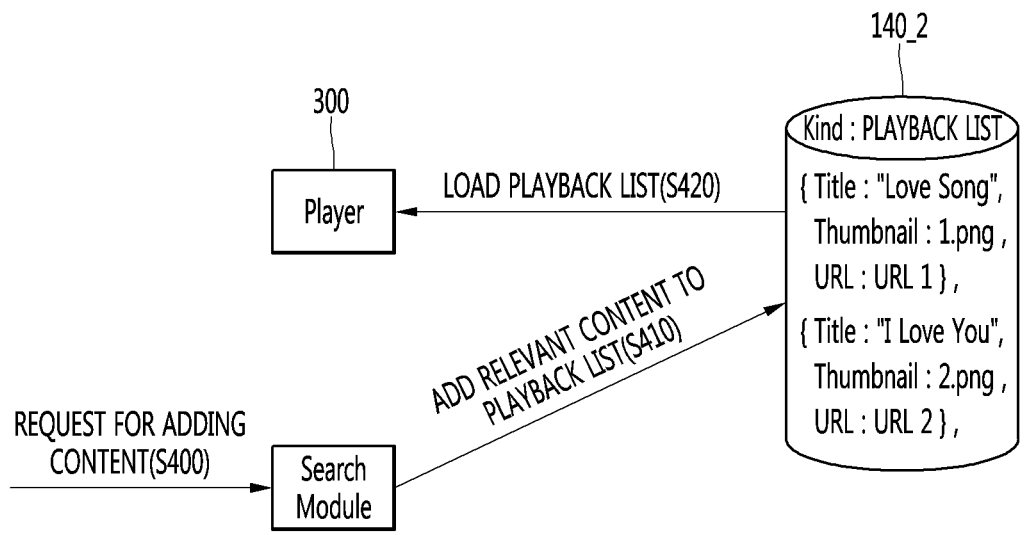
FIGS. 9A to 9C illustrate an operation of adding the content, which is found according to an embodiment illustrated in FIGS. 8A to 8B, to the playback list
Figure 9B:
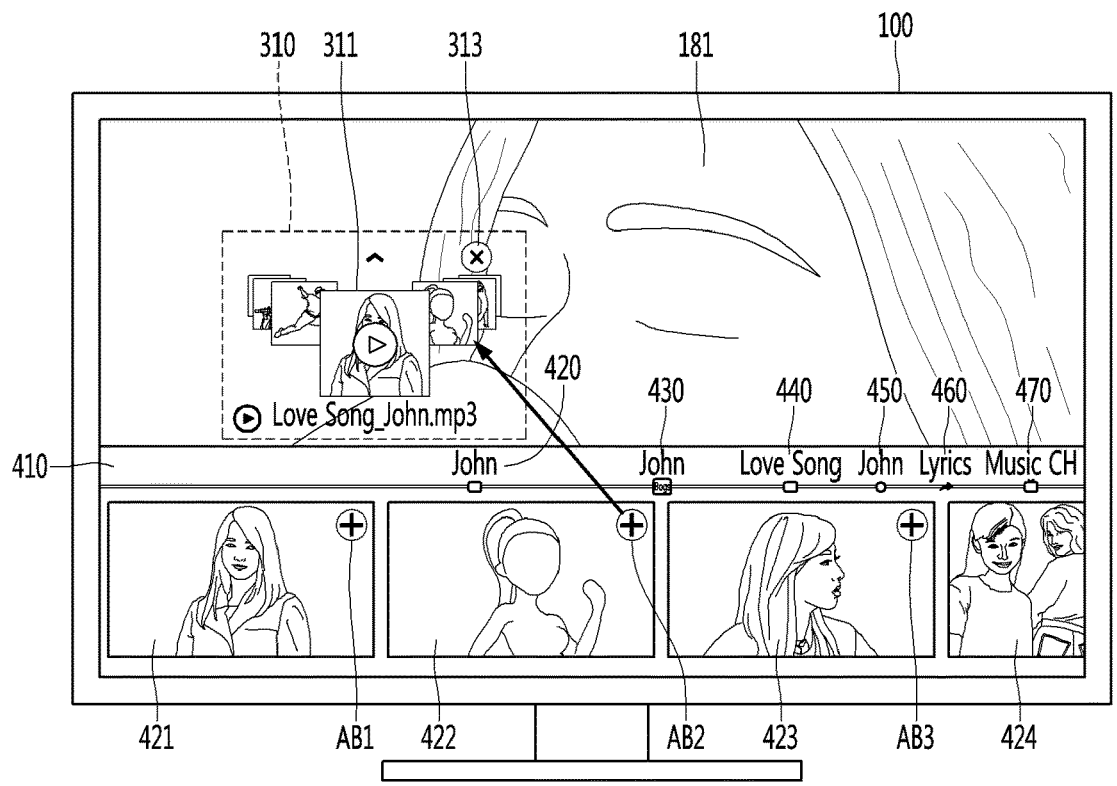
Figure 9C:
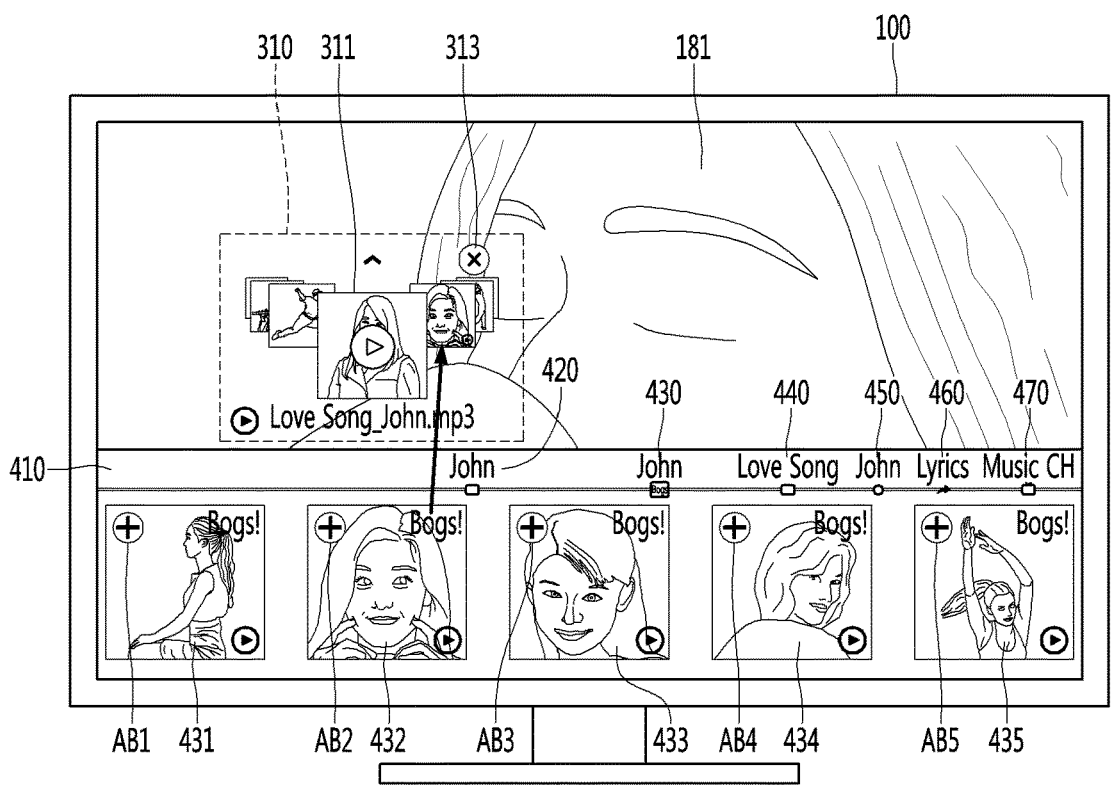

FIGS. 9A to 9C illustrate an operation of adding the content, which is found according to an embodiment illustrated in FIGS. 8A to 8B, to the playback list Referring to FIG. 9A, the controller 170 may receive the request for adding content through the user input interface unit 150 (S400). The request for adding the content may be a request for adding any one of multiple pieces of content found according to embodiments of FIGS. 8A to 8B to the playback list The request for adding the content will be described later with reference to FIGS. 9A to 9C.

The search module 400 may add one piece of content to the playback list in response to the request for adding the content (S410). In detail, the search module 400 may store information of the content in a second database 140_2. The second database 140_2 may store information of content included in the playback list. For example, the information of the content stored in the second database 140_2 may include a title, a thumbnail image, and a URL (storage location of the content file if the content is stored in the display device 100) of the content, but the present invention is not limited thereto.

The player 300 may load the playback list from the second database 140_2 (S420). Accordingly, content newly added to the playback list according to the request for adding the content may be reproduced by the player 300

Referring to FIG. 9B, the controller 170 may display additional buttons AB1 to AB3 on the found content 421 to 424 displayed on the search result window 410. The controller 170 (or search module 400) may receive an input for any one additional button (for example, the second additional button AB2) according to the request for adding the content and may add content 422 corresponding to the second additional button AB2 to the playback list in response to the received input. As the content 422 is added to the playback list, a thumbnail image of the content 422 may be additionally displayed on the execution screen 310 of the multimedia reproducing application.

Referring to FIG. 9C, the controller 170 may display the list of content 431 to 435 found through the search command corresponding to the second category 430, in response to the request for selecting the second search category 430 from among search categories 420, 430, 440, 450, 460, and 470. In this case, the content provider of the content 421 to 424 included in the first search category 420 may be mutually different from the content provider of the content 431 to 435 included in the second search category 430.

The controller 170 displays the additional buttons AB1 to AB5 on the content 431 to 434 displayed on the search result window 410. When receiving an input for anyone additional button (for example, the second additional button AB2), the controller 170 may add content 432 to the playback list corresponding to the second additional button AB2. As the content 432 is added to the playback list, a thumbnail image of the content 432 may be additionally displayed on the execution screen 310 of the multimedia reproducing application.

In other words, according to an embodiment illustrated in FIGS. 9A to 9C, the user may conveniently add the associated content found in association with the content, which is currently reproduced through the multimedia reproducing application, to the playback list. In addition, the display device 100 may add various pieces of content provided from mutually different content providers to one playback list, thereby enabling the user to manage integrally content.

Figure 10:
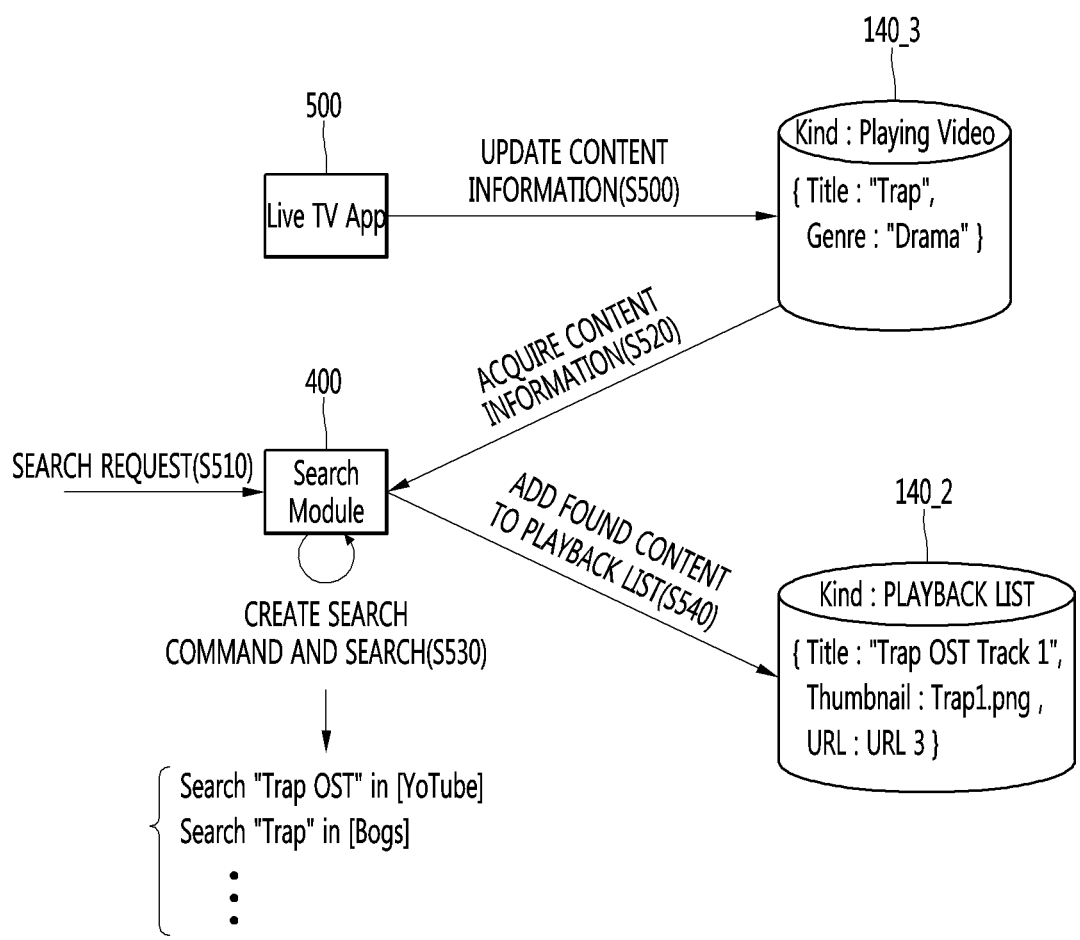
FIG. 10 is a view illustrating an embodiment that relevant content is searched based on the information on real-time broadcast content provided through the display device and the found content is added to the playback list.

FIG. 10 is a view illustrating an embodiment that relevant content is searched based on the information on real-time broadcast content provided through the display device and the found content is added to the playback list.

A live TV application 500 illustrated in illustrated in FIG. 10 may refer to an application performing the operation of displaying real-time broadcast content on the display 180 based on a broadcast signal received from the broadcast reception unit 130. The operation of the TV application 500 may be controlled by the controller 170.

Referring to FIG. 10, the live TV application 500 may update information on the real-time broadcast content, which is currently being displayed on the display 180, into a third database 140_3 (S500). The third database 140_3 may be used for storing information of the currently displayed real-time broadcast content or video content. The third database 140_3 may be included in the memory 140, but may be provided separately from the memory 140. According to the embodiment, the third database 140_3 may be integrated with the first database 140_1 of FIG. 8A.

The information on the currently displayed broadcast content may include, but is not limited to, the title and genre of the broadcast content. For example, when the title of the currently displayed broadcast content is "Trap" and the genre is "Drama", the live TV application 500 may update the information into the third database 140_3.

The controller 170 may receive the search request through the user interface unit 150 (S510). Since the search request is substantially the same as the search request described in step S320 of FIG. 8A, the details thereof will be omitted below. The controller 170 may control the operation of the search module 400 in response to the received search request.

The search module 400 acquires the content information from the third database 140_3 (S520), generates at least one search command using the acquired content information, and performs a search operation using the created search command (S530). The search module 400 may add at least one of searched content to the playback list, based on the request for adding content (S540). Since step S520 to S540 are similar to step S330 and step S340 of FIG. 8A, and step S400 and step S410 of FIG. 9A, the details thereof will be omitted.

Figure 11A:
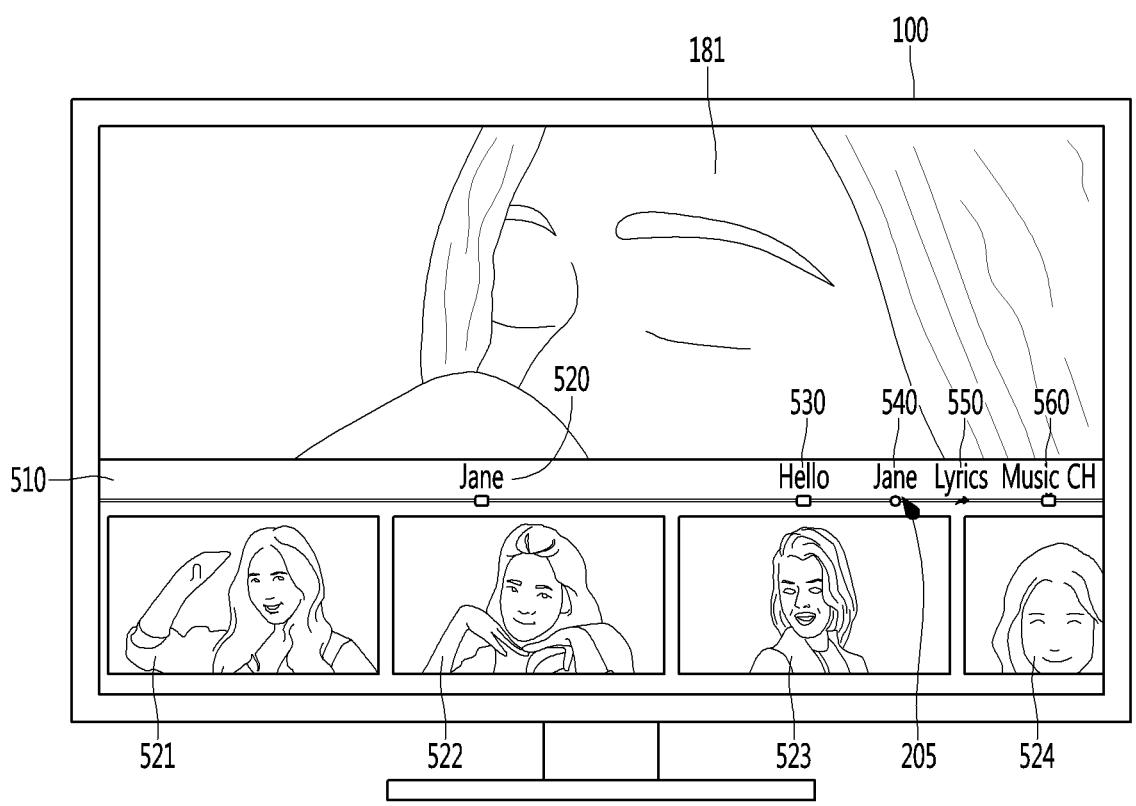
FIGS. 11A to 11B are views illustrating an embodiment of providing various pieces of information on an artist related to the content.
Figure 11B:
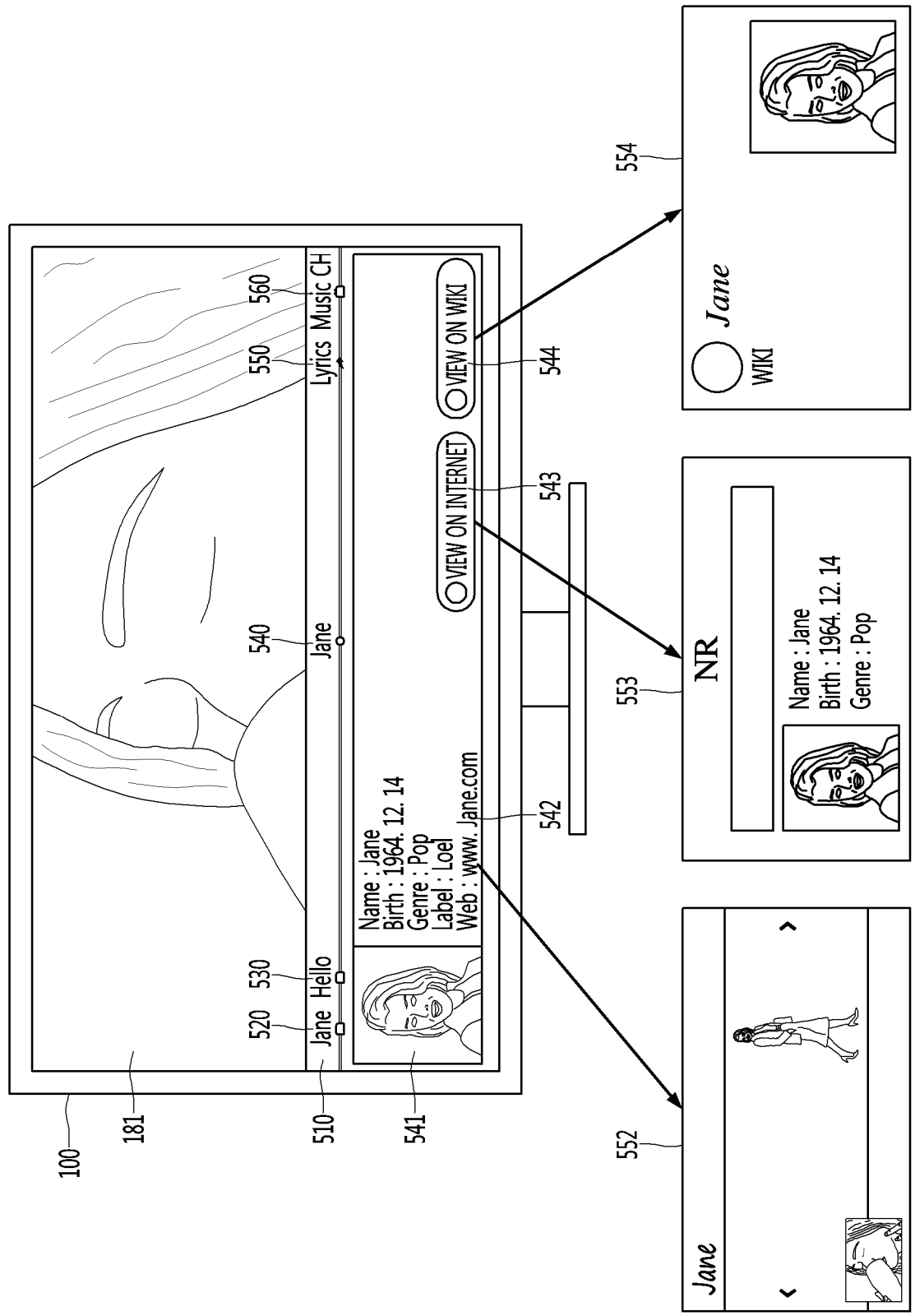

FIGS. 11A to 11B are views illustrating an embodiment of providing various pieces of information on an artist related to the content.

Referring to FIGS. 11A and 11B, the controller 170 may receive a request for selecting a search category (for example, a third search category 540) including a search result associated with artists from among search categories 520, 530, 540, 550, and 560 displayed on the search result window 510.

The controller 170 may display an artist information window 541 in the search result window 510 in response to the received request for selecting the search category. As illustrated in FIG. 11B, the artist information window 541 may include information on the profile of the artist. The information on the profile of the artist may include various pieces of information such as a photograph, the name, the date of birth, the genre, and the web-site of the artist. The information on the profile may be stored in a separate server connected to the display device 100. According to an embodiment, the artist information window 541 may include an artist's web-site address link 542 to provide more detailed information about the artist, an internet connection button 543 to provide search results about the artist over the Internet, and a previous connection button 544, but the present invention is not limited thereto and may provide various means for provide detailed information about the artist.

The controller 170 may display a web-site connection screen 552 of the artist in response to the request for selecting the web-site address link 542, may display an artist search result screen 553 on the Internet portal site in response to the request for selecting the Internet connection button 543, and may display an artist search result screen 554 on a dictionary in response to the request for selecting the dictionary connection button 544.

In other words, the display device 100 may effectively provide various pieces of information associated with the artist of content to a user.

The description will be made with reference to FIG. 5 again.

The display device 100 may reproduce first content of the playback list, which is loaded, through an application associated with the first content provider (S120).

In general, the content provided by a content provider may be output only through an application associated with the content provider (for example, a dedicated reproduction application). In other words, the multimedia reproducing application installed in the display device 100 may directly reproduce the content stored in the display device 100, but may not directly reproduce a content provided by a specific content provider.

Therefore, according to an embodiment of the present invention, the multimedia reproducing application may determine the content provider when playing the content of the playback list, and may control the content to be reproduced through an application associated with the content provider based on the determination result.

The display device 100 may recognize whether the first content, which is being reproduced, is completely reproduced (S130).

Conventional multimedia reproducing applications may not recognize whether the first content is completely reproduced when the first content is reproduced through an application associated with a specific content provider. Accordingly, in the conventional case, content provided from various content providers may not be added to the playback list managed by the multimedia reproducing application.

Meanwhile, the multiple reproduction application according to the embodiment of the present invention may recognize whether the first cont reproduction completion detector ent is completely reproduced using a 700 implemented in the display device 100.

If the reproduction of the first content is completed (YES in S140) according the recognition result, the display device 100 may reproduce the second content included in the playback list through the application associated with the second content provider (S150).

Steps S120 to S150 will be described in more detail with reference to FIGS. 12 to 17C.

Figure 12:
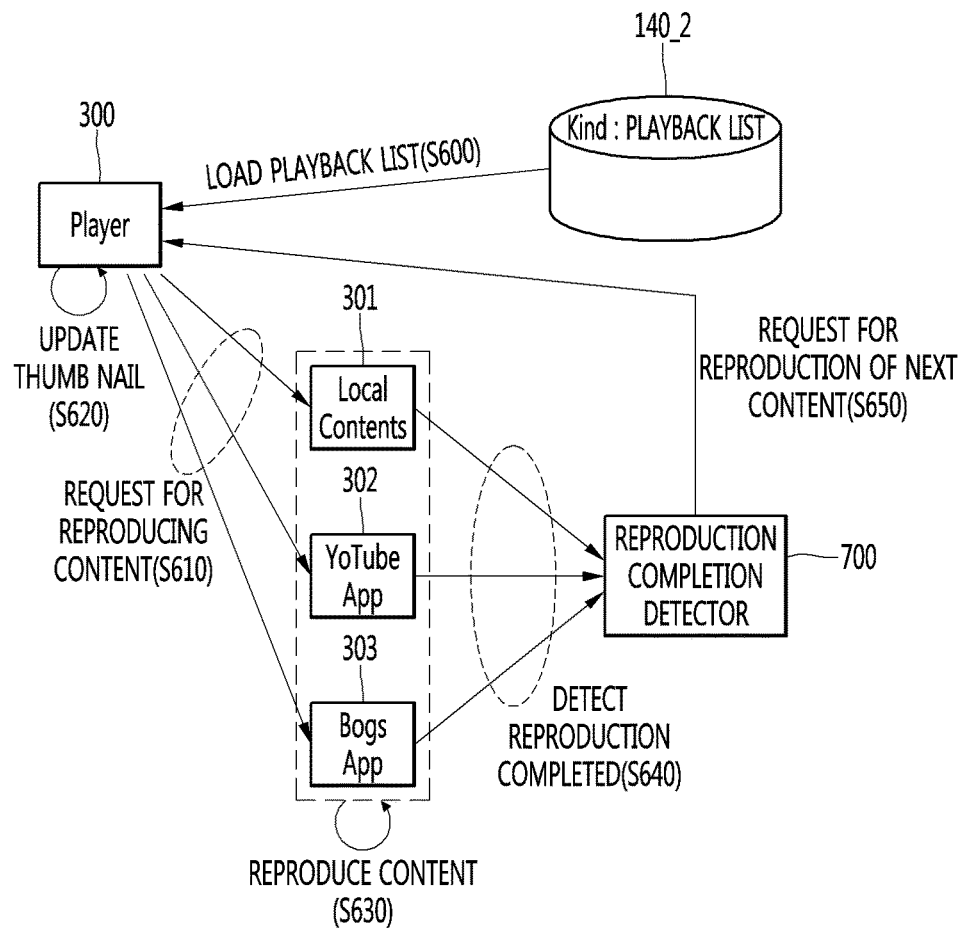
FIG. 12 is a view illustrating an operation that the display device according to an embodiment of the present disclosure detects that the reproduction of specific content in the playback list is completed and controls the reproduction of next content.

FIG. 12 is a view illustrating an operation that the display device according to an embodiment of the present disclosure detects that the reproduction of specific content in the playback list is completed and controls the reproduction of next content.

Referring to FIG. 12, the display device 100 may include the reproduction completion detector 700 to detect the reproduction completion of the content. The reproduction completion detector 700 may be implemented in the form of hardware or software.

The player 300 controlled by the controller 170 may load the playback list from the second database 140_2 having the playback list (S600). As described above, the playback list may have information (for example, a title, thumbnail image, and URL) of each of at least one pieces of content stored therein.

The player 300 (or the controller 170) may request for reproduction of any one of the content included in the loaded playback list (for example, the first content) (S610). In detail, the player 300 may identify the content provider based on the information (for example, URL) of the first content. Based on the identification result, the player 300 may request the application to play the first content so as to reproduce the first content through an application associated with the relevant content provider. For example, when the content provider of the first content is local content (content stored in the display device 100), the player 300 may directly reproduce the first content. Meanwhile, when the content provider of the first content is 'YouTube' or 'Bogs', the player 300 may request the application 302 associated with 'YouTube' or the application 303 associated with 'Bogs' to reproduce the first content.

The player 300 updates the thumbnail image displayed on the display 180 with the thumbnail image of the content to be reproduced (S620) and the application associated with the content provider who is requested to reproduce the content may reproduce the content (S630). According to the embodiment, the order of steps S620 and S630 may be freely changed.

The controller 170 may control the reproduction completion detector 700 to detect whether reproduction of the content is completed (S640). If it is detected that the reproduction of the content is completed, the reproduction completion detector 700 may transmit the detection result to the player 300 or request for reproduction of the next content (S650). The operation of the display device 100 after step S650 may be performed by repeating steps S610 to S650.

The operation of the display device 100 illustrated in FIG. 12 will be described in more detail with reference to FIGS. 13 to 17C.

FIGS. 13 to 16 are views showing various embodiments that the reproduction completion detector illustrated in FIG. 12 detects the completion of reproduction of the content.

Figure 13:
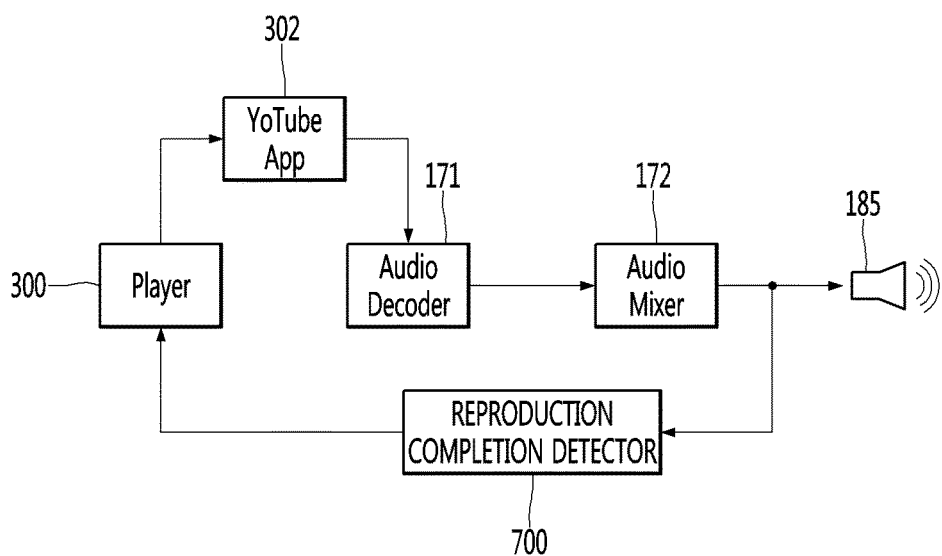
FIGS. 13 to 16 are views showing various embodiments that the reproduction completion detector illustrated in FIG. 12 detects the completion of reproduction of the content.

Referring to FIG. 13, when the content to be reproduced by the player 300 is the content provided from the 'YouTube', the player 300 may request the application 302 associated with 'YouTube' to reproduce the content. The application 302 may reproduce the content in response to the request from the player 300. It is assumed that the content reproduced in FIG. 13 is a content (for example, music content, or video content) that outputs audio through the audio output unit 185.

The audio signal of the content is processed through the audio decoder 171 and the audio mixer 172 and the processed audio signal may be output as the audio of the content through the audio output unit 185.

The reproduction completion detector 700 may detect completion of reproduction of the content by detecting whether the audio signal is transmitted from the audio decoder 171 or the audio mixer 172 to the audio output unit 185. In other words, when the audio signal from the audio mixer 172 to the audio output unit 185 is not output for the reference time, the reproduction completion detector 700 may detect that the reproduction of the content is completed and may request the player 300 to reproduce the next content. In this case, when the controller 170 does not output the audio of the content by receiving the mute command by the user, the controller 170 stops the detection operation of the reproduction completion detector 700 or does not reproduce the next content even if the reproduction of the content is detected as being completed by the reproduction completion detector 700.

Figure 14:
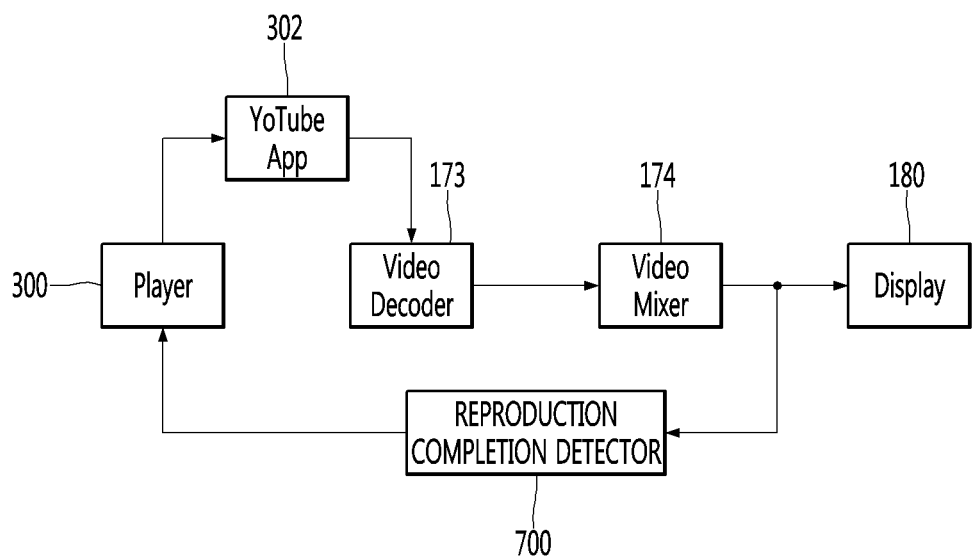

Referring to FIG. 14, the player 300 requests the application 302 associated with 'YouTube' to reproduce content, and the application 302 may reproduce the content in response to the request from the player 300. In this case, it is assumed that the content to be reproduced in FIG. 14 is video content output through the display 180.

The display unit 180 may receive a video signal of the content through a video decoder 173 and a video mixer 174 and output an image. The video decoder 173 and the video mixer 174 may process the data provided by the application 302 and transmit the video signal of the content, which is generated as a result of the processing to the display unit 180.

The reproduction completion detector 700 may detect completion of reproduction of the content by detecting whether the video signal is transmitted from the video decoder 173 or the video mixer 174 to the display 180. In other words, when the video signal is not output from the video decoder 173 or the video mixer 174 to the display unit 180 for the reference time, or when the screen displayed based on the video signal is identical for a specific time or more or a specific screen (for example, a black screen) is displayed, the reproduction completion detector 700 detects that the reproduction of the content is completed and may request the player 300 to reproduce the next content. At this time, when a pause command is received from the user and the reproduction of the content is temporarily stopped, the controller 170 stops the detection operation of the reproduction completion detector 700 or may not reproduce next content even if the reproduction completion detector 700 detects that the reproduction of the content is completed.

Figure 15:
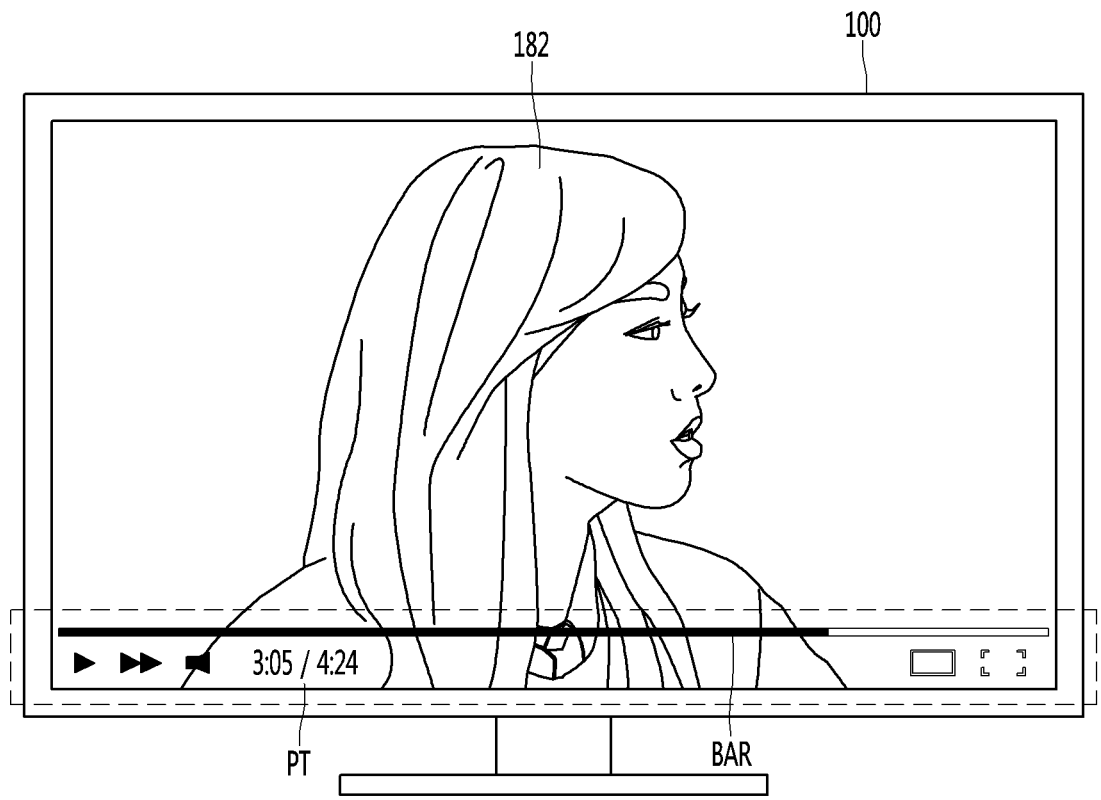

Referring to FIG. 15, the controller 170 may display a reproduction screen of an application associated with the content provider of the content on the display unit 180 when the content is reproduced. The reproduction completion detector 700 may detect that the reproduction of the content is completed, based on the reproduction state information included in the reproduction screen. The reproduction state information includes a reproduction timer (PT) indicating a current reproduction time/total reproduction time, and/or a reproduction status bar (BAR) and may visually provide the reproduction state of the content 182 using the reproduction state bar (BAR). The reproduction status bar (BAR) may be displayed in the form of a progress bar, but the present invention is not limited thereto. The reproduction timer (PT) and the reproduction state bar (BAR) may be displayed in various forms according to the type of the reproduction application.

The reproduction completion detector 700 may recognize the reproduction status information (the reproduction timer PT and/or the reproduction status bar BAR) using the known image recognition technology, and may detect that the reproduction of the content is completed using the recognized reproduction state information. For example, when the current reproduction time of the reproduction timer PT is equal to the total reproduction time, or when all of the colors of the reproduction status bar (BAR) are filled, the reproduction completion detector 700 may detect that the reproduction of the content is completed.

Figure 16:
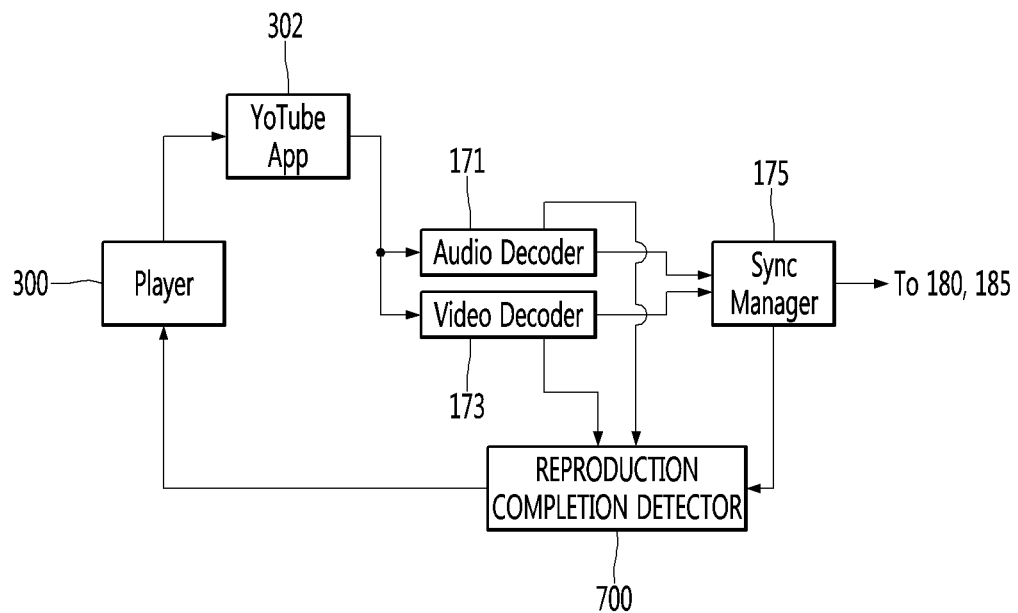

Referring to FIG. 16, the player 300 requests the application 302 associated with 'YouTube' to reproduce the content as described with reference to FIG. 13, and the application 302 may reproduce the content in response to the request from the player 300. In this case, it is assumed that the content reproduced in FIG. 16 is multimedia content, the image of which is output through the display unit 180, and the audio of which is output through the audio output unit 185.

When the image and the audio of the content are simultaneously output, the controller 170 may perform a synchronization operation between the video signal and the audio signal using the sync manager 175 included in the display apparatus 100.

The reproduction completion detector 700 may detect completion of reproduction of the content by detecting whether a sink manager 175 is operated. In other words, if the sink manager 175, which is in operation, is not operated for a specific period of time, the reproduction completion detector 700 may detect that the reproduction of the content is completed and request the player 300 to reproduce next content. According to an embodiment, the reproduction completion detector 700 may detect completion of reproduction of the content by detecting whether an audio signal and/or a video signal is output from the audio decoder 171 and/or the video decoder 173.

When receiving a reproduction request for the next content from the reproduction completion detector 700 according to the embodiment shown in FIGS. 13 to 16, the player 300 requests an application associated with the content provider of next content to reproduce the next content.

In addition, the reproduction completion detector 700 included in the display device 100 simultaneously performs at least some of operations of detecting the content reproduction completion illustrated in FIGS. 13 to 16, thereby improving the accuracy in detecting content reproduction completion.

Figure 17A:
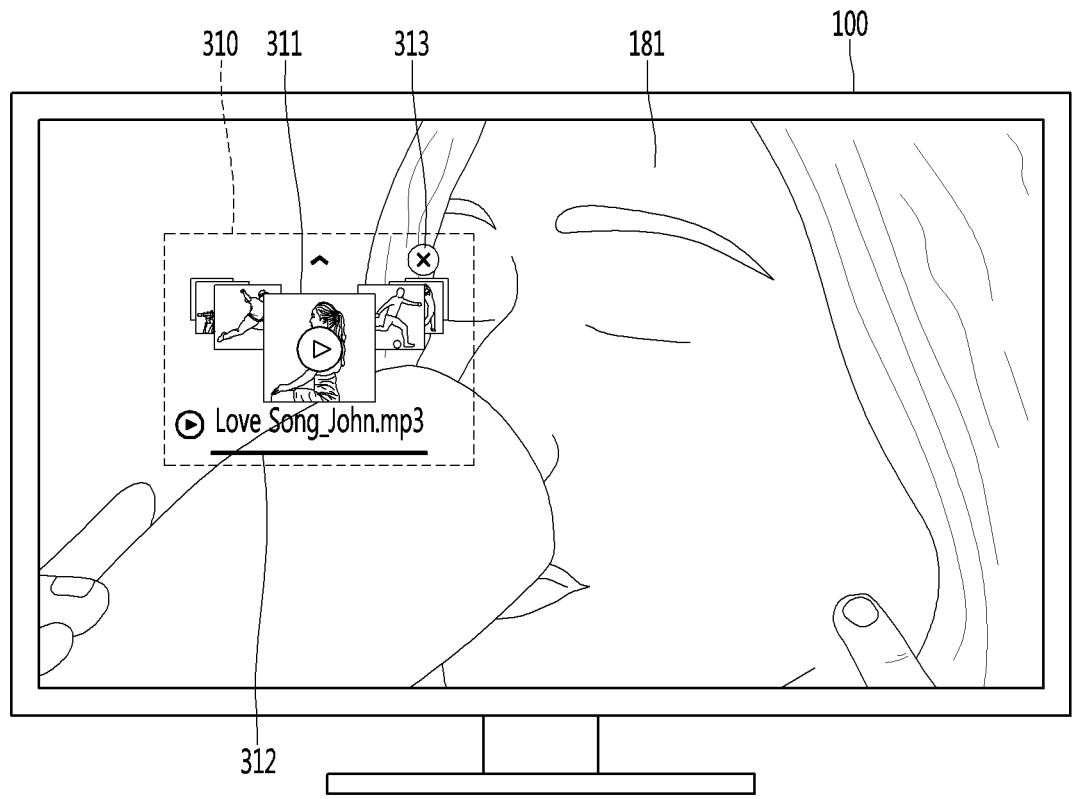
FIGS. 17A to 17C are views illustrating an operation that the display device according to the embodiment of the present invention reproduces various pieces of content provided from a plurality of content providers.
Figure 17B:
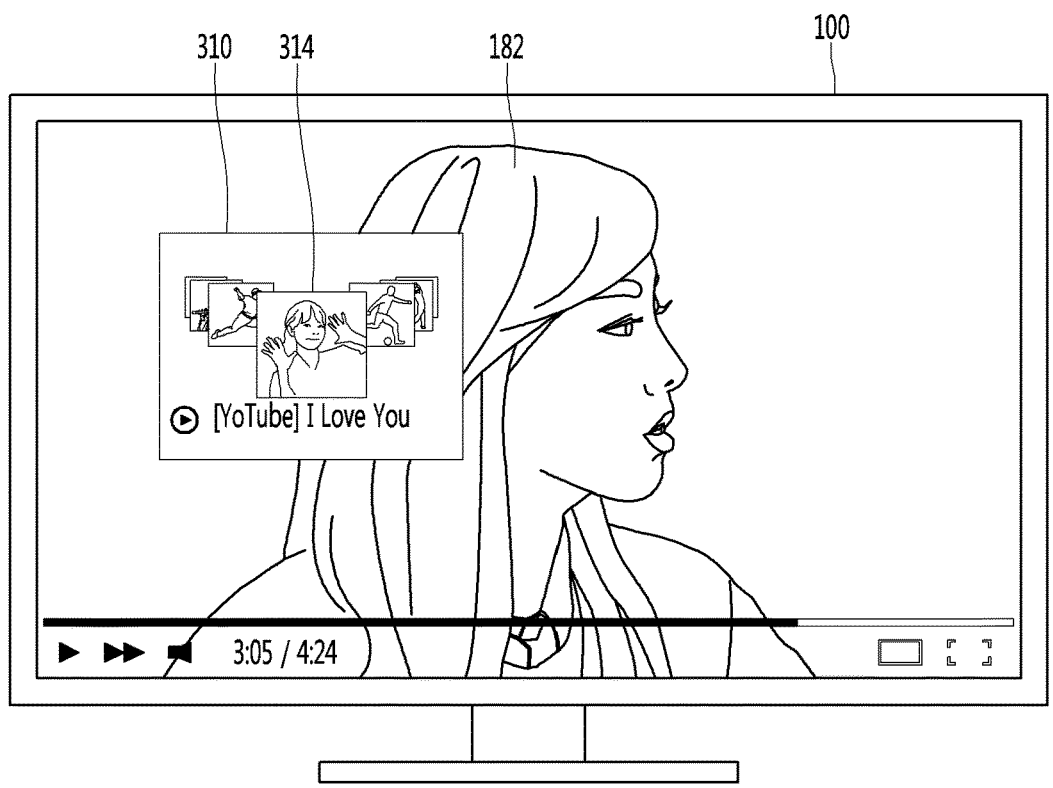
Figure 17C:
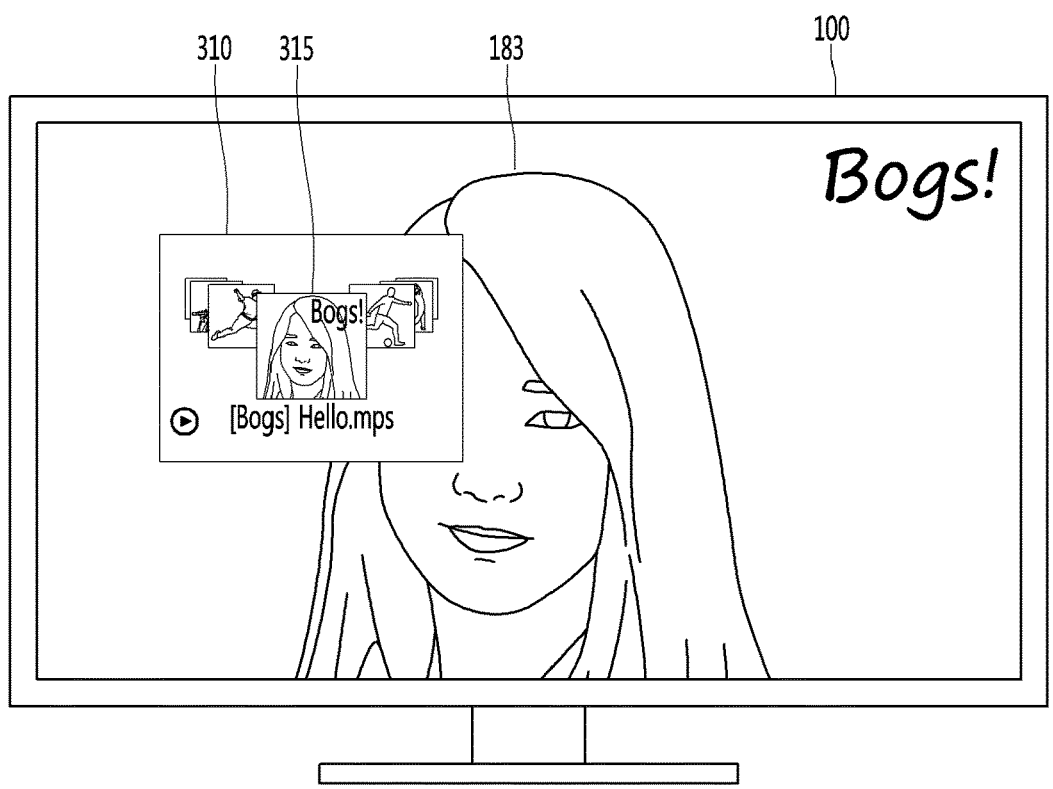

FIGS. 17A to 17C are views illustrating an operation that the display device according to the embodiment of the present invention reproduces various pieces of content provided from a plurality of content providers.

Referring to FIG. 17A, the player 300 may reproduce first content 311 among multiple pieces of content included in the playback list. For example, when the first content 311 is a content (e.g., local content stored in the display device 100) that may be reproduced by the player 300, the player 300 may directly reproduce the first content 311. In this case, the player 300 may directly sense whether the reproduction of the first content 311 is completed.

Referring to FIG. 17B, when the reproduction of the first content 311 is completed, the player 300 may reproduce the second content 314. When the second content 314 is content that is not reproduced by the player 300 (e.g., the content is reproduced through an application associated with the 'YoTube' content provider), the player 300 may request the application associated with the 'YoTube' to reproduce the second content 314. Accordingly, the application may reproduce the second content 314 and the reproduction screen may be displayed as illustrated in FIG. 17.

The controller 170 may control the reproduction completion detector 700 to sense whether or not the reproduction of the second content 314 through the application is completed. The operations for detecting whether or not the reproduction is completed may refer to the operations described above with reference to FIGS. 13 to 16.

When it is detected that the reproduction of the second content 314 is completed, the player 300 may reproduce third content 315 which is the next content of the second content 314. When the third content 315 is content that is not reproduced by the player 300 (for example, when the content is reproduced through an application associated with the 'Bogs' content provider), the player 300 may request the application associated with 'Bogs' to reproduce the third content 315. Accordingly, the application may reproduce the third content 315 and display a reproduction screen as shown in FIG. 17C. The controller 170 may control the reproduction completion detector 700 to sense whether the reproduction of the third content 315 is completed.

In other words, according to the embodiment illustrated in FIGS. 12 to 17C, when the content included in the playback list is reproduced through the application associated with the content provider of the content, the display device 100 detects whether the reproduction of the content is completed, thereby sequentially providing content provided through various content providers. Therefore, since multiple pieces of content provided by various content providers may be managed and reproduced by one playback list, the convenience may be improved.

According to an embodiment, the above-described method may also be embodied as processor-readable codes on a program-recorded medium. According to an embodiment, the above-described method may be embodied as processor-readable codes in a medium on which a program is recorded. Examples of processor-readable mediums include ROM, RAM, CD-ROM, a magnetic tape, a floppy disk, an optical data storage device, and the like. If desired, the processor-readable medium may be realized in the form of a carrier wave (for example, a transmission over the Internet). The aforementioned display devices are not applied such that the configurations and methods according to the embodiments are limited, but all or part of the embodiments may be selectively combined and configured to achieve various modifications.

The invention claimed is:

1. A display device comprising:
a display unit;
a memory configured to store a playback list including first content provided by a first content provider and a second content provided by second content provider,
at least one controller configured to:
display the playback list on the display unit;
reproduce the first content included in the displayed playback list through a dedicated application associated with the first content provider;
determine whether the first content is completely reproduced; and
reproduce the second content through a dedicated application associated with the second content provider based on a sensing result; and
a reproduction completion sensor configured to sense whether content is completely reproduced,
wherein the display unit is configured to:
display a reproduction screen of the dedicated application associated with the first content provider, when the first content is reproduced, and
wherein the reproduction completion sensor is configured to:
recognize reproduction state information included in the reproduction screen through image recognition; and
sense whether the first content is completely reproduced by using the recognized reproduction state information.

2. The display device of claim 1, wherein the at least one controller is configured to display, when a multimedia reproducing application installed in the display device is executed, the playback list of the executed multimedia reproducing application on the display unit.

3. The display device of claim 1,
wherein the at least one controller is configured to:
reproduce the second content through the dedicated application associated with the second content provider, when it is sensed, by the reproduction completion sensor, that the first content is completely reproduced.

4. The display device of claim 3, wherein the reproduction completion sensor is configured to:
sense whether an audio signal associated with the first content is transmitted to an audio output unit; and
sense that the first content is completely reproduced, when the audio signal fails to be transmitted to the audio output unit for a reference time, based on the sensing result.

5. The display device of claim 4, wherein the at least one controller is configured to:
deactivate a sensing operation of the reproduction completion sensor, when an audio portion of the first content is not output in response to a mute command received during reproduction of the first content.

6. The display device of claim 3, wherein the reproduction completion sensor is configured to:
sense whether a video signal associated with the first content is transmitted to the display unit; and
sense that the first content is completely reproduced, when the video signal fails to be transmitted to the display unit for a reference time, based on the sensing result.

7. The display device of claim 1, wherein the at least one controller is configured to:
acquire information on content currently provided through the display device;
create at least one search command based on the acquired information;

search for at least one piece of content associated with the currently provided content using the created search command; and display the at least one associated content, which is found, on the display unit.

8. The display device of claim 7, wherein the at least one controller is configured to:

display, on the display unit, a search result window including the at least one associated content which is found, wherein the search result window includes at least one search category corresponding to each of the at least one search command, and wherein each of the at least one associate content is included in one of the at least one search category.

9. The display device of claim 7, wherein the at least one controller is configured to:

receive a request for adding one associated content of the at least one associated content, which is displayed on the display unit, to the playback list; and add the one associated content to the playback list in response to the received request.

* * * * *